United States Patent
Bar-Yanai et al.

(10) Patent No.: US 12,120,011 B2
(45) Date of Patent: *Oct. 15, 2024

(54) BIT-RATE EXTRACTION FOR ENCRYPTED VIDEO

(71) Applicant: Vasona Networks Inc., Austin, TX (US)

(72) Inventors: Roni Bar-Yanai, Even Yehuda (IL); Nery Strasman, Ramat Gan (IL)

(73) Assignee: Vasona Networks, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,000

(22) Filed: Feb. 28, 2023

(65) Prior Publication Data

US 2023/0208738 A1 Jun. 29, 2023

Related U.S. Application Data

(63) Continuation of application No. 17/493,510, filed on Oct. 4, 2021, now Pat. No. 11,616,710, which is a continuation of application No. 14/578,579, filed on Dec. 22, 2014, now Pat. No. 11,165,680.

(60) Provisional application No. 62/050,265, filed on Sep. 15, 2014.

(51) Int. Cl.
*G06F 15/173* (2006.01)
*H04L 1/20* (2006.01)
*H04L 43/062* (2022.01)
*H04L 43/0894* (2022.01)
*H04N 21/24* (2011.01)

(52) U.S. Cl.
CPC ............ *H04L 43/0894* (2013.01); *H04L 1/20* (2013.01); *H04N 21/2402* (2013.01); *H04L 43/062* (2013.01)

(58) Field of Classification Search
None
See application file for complete search history.

(56) References Cited

U.S. PATENT DOCUMENTS

| | | | |
|---|---|---|---|
| 7,403,623 B2* | 7/2008 | Cerf | H04L 9/0858 380/278 |
| 7,496,804 B2* | 2/2009 | Juncker | H04L 1/203 714/704 |
| 7,782,767 B1* | 8/2010 | Lin | H04L 65/1101 370/252 |
| 7,958,534 B1* | 6/2011 | Beser | H04L 12/2801 725/111 |
| 8,521,901 B2* | 8/2013 | Wason | H04L 47/10 370/230.1 |
| 2006/0095944 A1* | 5/2006 | Demircin | H04N 19/30 375/E7.181 |
| 2007/0140651 A1* | 6/2007 | Hashimoto | H04N 21/47214 |

(Continued)

OTHER PUBLICATIONS

Notice of Allowance mailed on Nov. 29, 2022, filed in U.S. Appl. No. 17/493,510, pp. 1-6.

(Continued)

*Primary Examiner* — Atta Khan

(57) ABSTRACT

A method includes monitoring a media stream that is streamed over a network at a given media bit-rate in a sequence of traffic bursts. Respective data volumes of one or more traffic bursts of the sequence are estimated, and the given media bit-rate is derived from the estimated data volumes.

13 Claims, 2 Drawing Sheets

(56) References Cited

U.S. PATENT DOCUMENTS

| | | | |
|---|---|---|---|
| 2008/0311949 A1* | 12/2008 | Koskinen | H04W 72/005 |
| | | | 455/517 |
| 2011/0001833 A1* | 1/2011 | Grinkemeyer | H04L 1/205 |
| | | | 348/192 |
| 2011/0107152 A1* | 5/2011 | Adams | G06F 11/3636 |
| | | | 714/43 |
| 2012/0005368 A1* | 1/2012 | Knittle | H04N 21/23439 |
| | | | 375/E7.02 |
| 2012/0311126 A1* | 12/2012 | Jadallah | H04L 65/80 |
| | | | 709/224 |
| 2013/0078977 A1* | 3/2013 | Anderson | H04B 1/036 |
| | | | 455/418 |

OTHER PUBLICATIONS

Terminal Disclaimer filed on Nov. 4, 2022, filed in U.S. Appl. No. 17/493,510, pp. 1-3.
Terminal Disclaimer approved on Nov. 4, 2022, filed in U.S. Appl. No. 17/493,510, p. 1.
Response to Non-Final Office Action filed on Nov. 4, 2022, filed in U.S. Appl. No. 17/493,510, pp. 1-6.
Non-Final Office Action dated Aug. 4, 2022, filed in U.S. Appl. No. 17/493,510, pp. 1-11.

* cited by examiner

BIT-RATE EXTRACTION FOR ENCRYPTED VIDEO

CROSS-REFERENCE TO RELATED APPLICATIONS

This application claims the benefit of U.S. Provisional Patent Application 62/050,265, filed Sep. 15, 2014, whose disclosure is incorporated herein by reference.

FIELD OF THE INVENTION

The present invention relates generally to communication analysis, and particularly to methods and systems for bit-rate estimation.

BACKGROUND OF THE INVENTION

Adaptive Bit-Rate (ABR) is a multimedia streaming technique, in which multimedia content is encoded in advance at several predefined bit rates and divided into segments. The content is streamed to a client, while adaptively selecting the bit rate to be streamed depending, for example, on the communication channel conditions en-route to the client. ABR can be used over various communication protocols, such as Hyper-Text Transfer Protocol (HTTP) and HTTP-Secure (HTTPS).

SUMMARY OF THE INVENTION

An embodiment of the present invention that is described herein provides a method including monitoring a media stream that is streamed over a network at a given media bit-rate in a sequence of traffic bursts. Respective data volumes of one or more traffic bursts of the sequence are estimated, and the given media bit-rate is derived from the estimated data volumes.

In some embodiments, estimating the data volumes and deriving the given media bit-rate are performed without decoding content of the media stream. In some embodiments, the media stream is encrypted, and estimating the data volumes and deriving the given media bit-rate are performed without decryption of the media stream.

In some embodiments, estimating the data volumes includes identifying respective start times of the traffic bursts, and distinguishing between the traffic bursts using the identified start times. In an example embodiment, identifying the start times includes interpreting upstream packets as requests that are each followed by a respective traffic burst.

In another embodiment, estimating the data volumes includes distinguishing between a buffering phase and a steady-state phase of the media stream, and assessing the data volumes during the steady-state phase. In yet another embodiment, estimating the data volumes includes distinguishing between a buffering phase and a steady-state phase of the media stream, and assessing the data volumes during the buffering phase.

In some embodiments, the method includes calculating a performance metric of the media stream from the estimated data volumes of the traffic bursts. Calculating the performance metric may include calculating at least one of a start delay, an occurrence of one or more stalls and a length of the stalls in the media stream. In an embodiment, the traffic bursts convey respective content segments having a predefined playback duration, and deriving the given media bit-rate includes, when the media stream is subject to congestion in the network, estimating the given media bit-rate based on the playback duration.

In a disclosed embodiment, the method includes estimating the data volumes and deriving the given media bit-rate only in response to verifying that the media stream matches an Adaptive Bit-Rate (ABR) traffic pattern. In an embodiment, deriving the given media bit-rate includes verifying that the data volumes of the two or more traffic bursts differ from one another by no more than a predefined difference. In another embodiment, deriving the given media bit-rate includes selecting a media bit-rate that best matches the estimated data volumes from among a predefined set of media bit-rates.

There is additionally provided, in accordance with an embodiment of the present invention, an apparatus including an interface and a processor. The interface is configured to receive a media stream that is streamed over a network at a given media bit-rate in a sequence of traffic bursts. The processor is configured to estimate respective data volumes of one or more traffic bursts of the sequence, and to derive the given media bit-rate from the estimated data volumes.

The present invention will be more fully understood from the following detailed description of the embodiments thereof, taken together with the drawings in which:

DETAILED DESCRIPTION OF EMBODIMENTS

Overview

Figure 1:
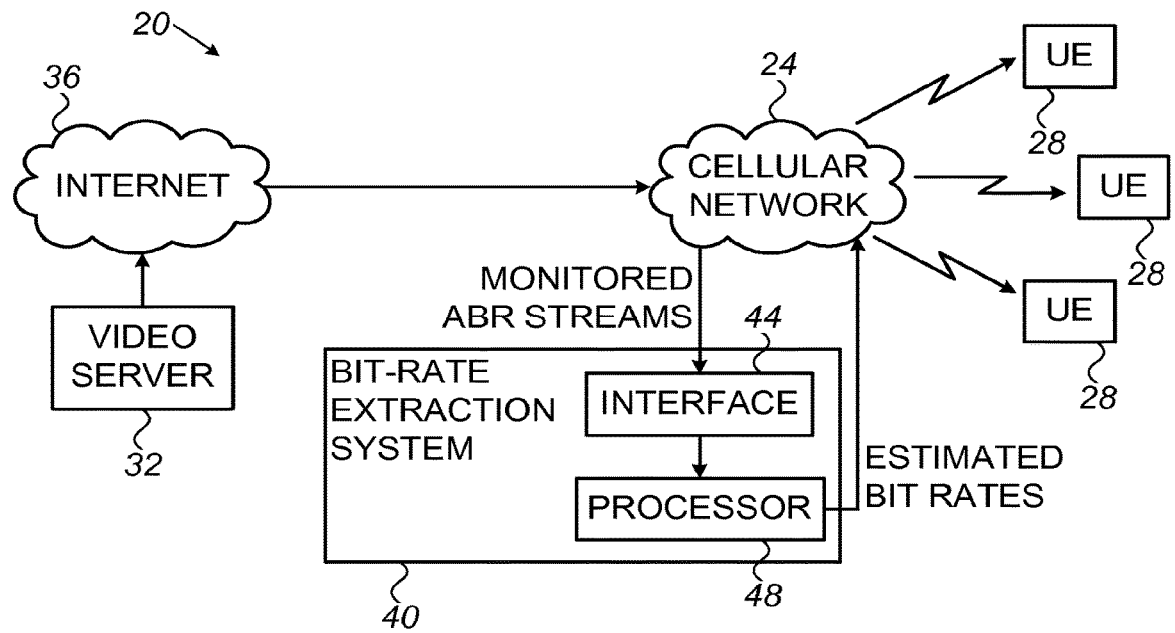
FIG. 1 is a block diagram that schematically illustrates a communication network that uses video bit-rate extraction, in accordance with an embodiment of the present invention.

In networks that carry video streaming traffic, it is often useful for a third party, other than the server and the client, to estimate the media bit rate of video streams. For example, an operator of a cellular communication network may use the estimated media bit-rates of video streams as an indication of the video quality experienced by clients. This indication can be used, for example, in allocating bandwidth among clients or for applying various Quality-of-Service (QoS) policies.

In this context, it is important to distinguish between media bit-rate and communication bit-rate. The term "media bit-rate" refers to the bit-rate of the actual media (e.g., video) content that is provided to the client. Generally, high media bit-rate corresponds to high media quality, and vice versa. The terms "communication bit-rate" or "traffic bit-rate" refers to the bit-rate of the communication traffic that carries the media. The communication bit-rate is not directly related to the media bit-rate. For example, for a given media bit-rate, the communication bit-rate may vary depending on the conditions of the communication channel to the client.

In some cases it is simple to extract the media bit-rate from the traffic. In many practical cases, however, a third party cannot measure the media bit-rate directly, e.g., because the video content is not accessible. For example, in many cases the video stream is encrypted and cannot be decoded by third parties. A common use case of this sort is Adaptive Bit-Rate (ABR) video transferred over HTTP-Secure (HTTPS).

Embodiments of the present invention that are described herein provide improved methods and systems for estimating the media bit-rate of multimedia streams. In some embodiments, a bit-rate extraction system monitors media streams, e.g., ABR streams, and estimates their media bit-rates without decoding or otherwise accessing the actual video content. In some embodiments the system estimates the media bit-rates by analyzing the characteristic traffic pattern of ABS streaming.

In ABR, the video content is encoded in advance at several media bit-rates, and segmented into segments of constant playback time (playback duration). The video is streamed to a client segment-by-segment, at a media bit-rate that can be chosen to match the client capabilities or channel conditions. The communication traffic carrying an ABR stream has a characteristic initial buffering phase, followed by a steady-state sequence of traffic bursts.

In some embodiments, the system identifies an ABR stream by detecting the above-described traffic pattern, distinguishes between the individual traffic bursts, estimates the data volumes in one or more of the traffic bursts, and derives the media bit-rate of the ABR stream from the estimated data volumes.

Several implementation examples and variations of the disclosed techniques are described below, such as methods for distinguishing between traffic bursts, and for distinguishing between the buffering phase and steady-state phase.

The disclosed techniques extract the media bit-rates of ABR video streams based solely on traffic volume measurements, without any sort of access or decoding of the video content. As such, these techniques are able to measure the media bit-rates even when the video stream, including both content, metadata and signaling, is encrypted.

Although the embodiments described herein refer mainly to ABR streams, the disclosed techniques are applicable to non-ABR streams, as well. Although the embodiments described herein refer mainly to video streaming, the disclosed techniques are applicable to other types of multimedia streams, such as audio streams.

System Description

FIG. 1 is a block diagram that schematically illustrates a communication network 20 that uses video bit-rate extraction, in accordance with an embodiment of the present invention. In network 20, a cellular communication network 24 serves multiple user terminals referred to as User Equipment (UEs) 28. The UEs may comprise, for example, cellular phones or mobile computing devices.

Among other communication services, network 24 transfers ABR video streams to UEs 28, to be displayed to users. In the description that follows, the terms "UE," "terminal," "client" and "user" are used interchangeably. In the present example, the ABR video streams are streamed from a video server 32, across a network 36 such as the Internet, and over cellular network 24 to the clients. The video server may comprise, for example, a Web-site such as YouTube or Netflix that provides video streaming.

At least some of the ABR video streams are encrypted, e.g., transferred over HTTPS. In such cases, the entire stream, including video content, metadata and bidirectional signaling, is encrypted. Because of the encryption, a given ABR stream is inaccessible to third parties other than video server 32 and the intended UE 28. A third party may comprise, for example, the service provider or operator of cellular network 24.

In some embodiments, a bit-rate extraction system 40 estimates the media bit-rates of ABR video streams transferred over network 24, even though the video streams are inaccessible due to encryption. In the present example, system 40 is operated by the operator of network 24, who uses the estimated media bit-rates for assessing and acting upon the video quality experienced by various users. Alternatively, however, system 40 can be operated by any other suitable party for any other suitable use.

In the embodiment of FIG. 1, system 40 comprises an interface 44 and a processor 48. Interface 44 is configured to monitor some or all of the video streams transferred over network 24. Processor 48 is configured to carry out the bit-rate estimation methods described herein, and possibly act upon the estimated bit-rates.

The configurations of network 20 and system 40 shown in FIG. 1 are example configurations, which are chosen purely for the sake of conceptual clarity. In alternative embodiments, any other suitable configuration can be used for network 20 and/or bit-rate extraction system 40. The different elements of system 40 may be implemented using suitable hardware, e.g., using one or more Application-Specific Integrated Circuits (ASICs) or Field-Programmable Gate Arrays (FPGAs), using software, or using a combination of hardware and software elements.

In some embodiments, processor 48 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Bit-Rate Estimation for Encrypted ABR Streams

In a typical ABR implementation, the video content is encoded in advance at several predefined media bit-rates. Each replica of the video content is then segmented into a sequence of segments having a constant playback time (or playback duration), and stored in the video server. A selected replica, having a media bit-rate that matches the client and/or communication channel, is streamed from the video server to the client. The segment edges are typically synchronized among the different replicas, so that it is possible to switch from one replica to another (i.e., from one media bit-rate to another) seamlessly during playback.

In an example embodiment, the video is encoded at three media bit-rates—300 Kbps, 800 Kbps and 1.2 Mbps. Typical segment lengths are between two and ten seconds. Alternatively, however, any other suitable bit-rates and segment lengths can be used.

When an ABR stream is streamed over network 24, e.g., over HTTPS, the resulting communication traffic has a characteristic temporal pattern.

Figure 2:
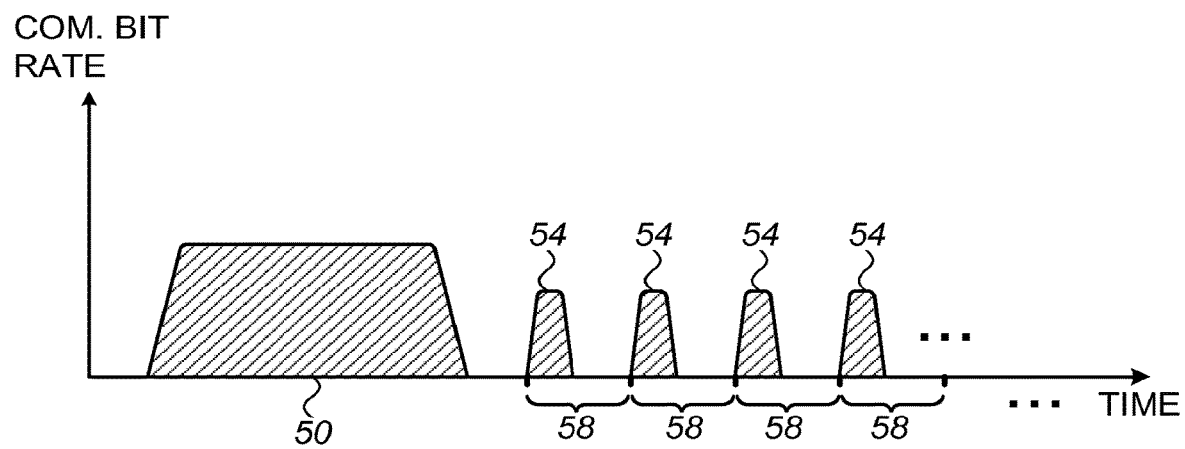
FIG. 2 is a graph showing a characteristic traffic pattern of an Adaptive Bit-Rate (ABR) video stream, in accordance with an embodiment of the present invention.

FIG. 2 is a graph showing the characteristic temporal traffic pattern of ABR video stream, in accordance with an embodiment of the present invention. The graph illustrates the communication bit-rate as a function of time. As explained above, the observable bit-rate is the communication bit-rate, which is not directly related to the media bit-rate.

An ABR session typically begins with an initial phase 50, which is referred to as a buffering phase. In the buffering phase, the client typically requests several segments consecutively, in order to initially fill its buffer and decide on the appropriate steady-state media bit-rate. Therefore, the buffering phase is typically characterized by a long initial traffic burst.

After initially filling its buffer and choosing the appropriate media bit-rate, the client typically requests one segment at a time. The client typically requests a new segment when its buffer reaches a certain low threshold. This ongoing process is referred to as a steady-state phase, and is characterized by a sequence of traffic bursts 54. Successive traffic bursts 54 are separated by idle periods. The time between successive traffic bursts (marked 58 in the figure) is equal to the constant playback time of the video segments.

Changes of media bit-rate during the steady-state phase are usually rare, because the rate switch is noticeable by the user. The client will therefore typically attempt to choose the best-performing media bit-rate during the buffering phase, and keep the media bit-rate constant during the steady-state phase.

Nevertheless, the media bit-rate in a given stream may change during the steady-state phase, for example in response to changes in the communication channel relative to the buffering phase. The techniques described herein are applicable regardless of whether the media bit-rate is constant, changes rarely or changes frequently during the steady-state phase.

In some embodiments, processor 48 of system 40 identifies the above-described traffic pattern of the ABR stream, and estimates the media bit-rate of the stream based on the pattern. In an embodiment, processor 48 measures the respective data volumes contained in one or more traffic bursts 54, and derives the media bit-rate from the measured data volumes.

If the number of bits in a traffic burst is X bytes, and the video segment playback time is T seconds, then the media bit-rate is BR=<X·8/T> bits/second (bps). The < > operator denotes averaging over multiple traffic bursts. Thus, processor 48 may measure the number of bits in a traffic burst (X) over several traffic bursts 54, and calculate BR using the known value of T.

In order to perform the calculation above, processor 48 should typically distinguish between consecutive traffic bursts, e.g., by identifying the start times of segments 58. In a typical ABR session, the client requests each new segment by sending a GET message to video server 32.

It is possible in principle to identify the GET messages and define the time of each GET message as the start time of a new segment. When the ABR stream is encrypted, however, the GET messages are also encrypted and cannot be decoded by system 40. Thus, in some embodiments, processor 48 interprets all upstream messages (messages from the client to the video server) as GET messages, and defines the interval between successive upstream messages as a respective segment.

In these embodiments, processor 48 measures the data volume between successive upstream messages, and treats this data volume as the data volume of a respective traffic burst 54. In alternative embodiments, processor 48 may distinguish between segments, and thus between traffic bursts, in any other suitable way. For example, the processor may identify the idle periods between bursts.

In some embodiments, processor 48 identifies buffering phase 50, as well, using the upstream GET messages. In an example embodiment, the processor may identify several GET messages (or simply several upstream messages) with little or no idle time between them. Such a pattern is highly indicative of the initial buffering phase.

When evaluating the media bit-rate using the BR=<X·8/T> relation, it is important to verify that the traffic bursts being averaged all have the same media bit-rate. Otherwise, e.g., if the media bit-rate has changed during the averaging period, the estimation is likely to be erroneous. In some embodiments, processor 48 avoids this situation by verifying that the data volumes in the bursts being averaged differ from one another by no more than a predefined difference. If this condition is not met, the processor may choose a different set of bursts for estimating the media bit-rate.

Typically, video server 32 uses a relatively small set of known predefined media bit-rates from which the client can select, e.g., three or four rates. This information can be used by processor 48 to improve performance. For example, after measuring the average data volume per traffic burst, processor 48 may choose the predefined media bit-rate that best matches the average data volume, from among the predefined media bit-rates in the set.

In some embodiments, processor 48 assesses the media bit-rate by assessing the data volumes during the steady-state phase. For example, it may be known (at least for a particular client type and a particular server) that the client always requests N segments in the buffering phase. Using this information, processor 48 may measure the data volume during the entire buffering phase and derive the media bit-rate from this measurement.

Typically, processor 48 estimates the media bit-rate separately per traffic burst. Evaluating the burst-by-burst behavior of the media stream enables processor 48 to calculate various metrics of interest. One example metric is the start delay—The time that elapses from the time the user sends the initial request to view the stream until the first image frame is displayed on the UE. The start delay can be derived, for example, from the buffering phase, or it can be calculated heuristically. For example, processor 48 may estimate the length of time needed for downloading ten seconds of content (or any other suitable playback duration), under an assumption that this content size is the size needed to start playing the stream.

Another metric of interest, which can be assessed from the burst-by-burst behavior of the streams, is the occurrence of stalls or freezes. A stall occurs when the UE is unable to download sufficient content to play back. For example, if thirty seconds have elapsed but the UE downloaded content for a playback duration of only 29.5 seconds, then a stall would occur. In this example, the thirty-second duration can be measured directly, and the 29.5-second duration can be inferred by processor 48 from the traffic bursts and respective bitrates.

Yet another metric of interest is the lengths of the stalls. Once a stall occurs, the streaming typically reverts back to the buffering phase. At this point, the same measurement of start Delay can be used by processor 48 to measure the length of the stall.

Alternatively, processor 48 may estimate various other suitable performance metrics of the media stream based on the estimated data volumes (and thus the media bit-rates) of the respective traffic bursts.

It should also be noted that the streaming pattern of FIG. 2 is typical of a non-congested network. In practice, the streaming process encounters congestion in network 36 and/or 24. In some embodiments, processor 48 is able to estimate the media bit-rate in the presence of congestion, as well. Such estimation is typically based on the knowledge of T, the video segment playback time used by video server 32.

In some embodiments processor 48 may measure T, as explained above, during non-congested periods, and apply the measured T during congestion. Alternatively, processor 48 may assume typical values of T that are known to be used by a particular service (e.g., YouTube). Since each traffic burst is downloaded between two consecutive GET messages (and often each traffic burst occurs on a different TCP connection), it is possible for processor 48 to calculate the media bit-rate under congestion from T.

Figure 3:
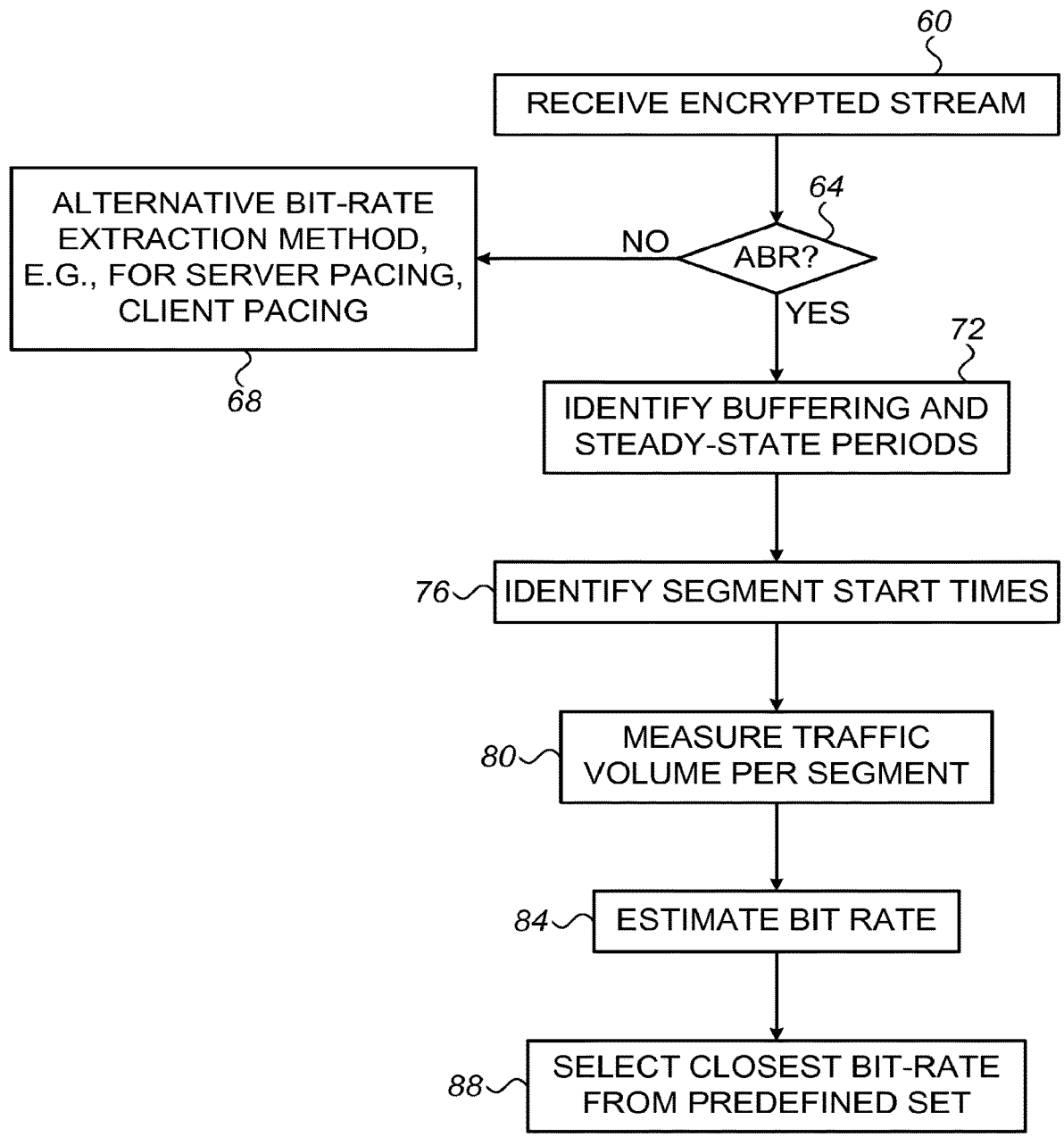
FIG. 3 is a flow chart that schematically illustrates a method for bit-rate extraction, in accordance with an embodiment of the present invention.

FIG. 3 is a flow chart that schematically illustrates a method for bit-rate extraction, in accordance with an embodiment of the present invention. The method begins with interface 44 of system 40 receiving an encrypted video stream, at an input step 60. (The description of FIG. 3 refers to a single stream for the sake of clarity. In real life, system 40 typically processes multiple streams in parallel.)

Processor 48 of system 40 checks whether the stream is an ABR video stream, at an ABR verification step 64. The processor may use the characteristic temporal pattern described above for this purpose. If the stream is not an ABR stream, processor 48 reverts to an alternative media bit-rate estimation method, at an alternative estimation step 68. Such alternative method may apply, for example, to client pacing or server pacing streaming modes.

If step 64 concludes that the monitored stream is indeed an ABR video stream, processor 48 proceeds to estimate the media bit-rate of the stream using the disclosed techniques. At a phase identification step 72, processor 48 distinguishes between the buffering phase and the steady-state phase. The processor then identifies the start times of segments 58 of the steady-state phase, at a segment identification step 76. At a data measurement step 80, processor 48 measures the data volume contained in each of one or more of traffic bursts 54.

Processor 48 then estimates the media bit-rate of the ABR stream based on the data volumes of the respective traffic bursts, at a bit-rate derivation step 84. At a selection step 88, processor 48 selects one of the predefined media bit-rates supported by server 32 that is closest to the media bit-rate estimated at step 84. In some embodiments, steps 84 and 88 can be combined, e.g., by using a direct mapping of data volume per burst to media bit-rate.

Although the embodiments described herein mainly address video streams, the methods and systems described herein can also be used in other applications, such as in bit extraction of audio and other types of media. Moreover, although the embodiments described herein refer mainly to encrypted streams, the disclosed techniques can also be used for measuring the media bit-rates of non-encrypted streams. For example, measuring the media bit-rate based on traffic pattern may be simpler and more computationally efficient than decoding the media content. Furthermore, since the disclosed techniques do not access the media content, they better protect user privacy.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A data processing system comprising:
one or more processors; and
a memory, coupled to the one or more processors, storing code, wherein execution of the code by the one or more processors causes the data processing system to perform operations comprising:
monitoring a media stream that is streamed over a network, from a server to a client, by the data processing system that is separate from the server and the client;
determining a traffic pattern of the monitored stream over time, including a communication bit-rate of the monitored media stream as a function of time;
identifying in the traffic pattern, a sequence of traffic bursts;
determining times of bursts in the sequence of traffic bursts;
measuring a time between successive traffic bursts in the sequence;
estimating respective data volumes of one or more traffic bursts of the sequence; and
deriving a given media bit rate of the media stream from a ratio between the estimated data volumes and the measured time between bursts; and
allocating bandwidth in the network or selecting a quality of service policy to be applied in the network based on an assessment of video quality experienced by a user responsive to the derived media bit-rate.

2. The data processing system of claim 1, wherein estimating the data volumes and deriving the given media bit-rate are performed without decoding content of the media stream, and wherein identifying the sequence of traffic bursts comprises interpreting upstream packets, from the client to the server, in a corresponding upstream of the monitored media stream as requests that are each followed by a respective traffic burst in the media stream.

3. The data processing system of claim 1, wherein the media stream is encrypted, and wherein estimating the data volumes and deriving the given media bit-rate are performed without decryption of the media stream.

4. The data processing system of claim 1, wherein identifying the sequence of traffic bursts comprises distinguishing between traffic bursts by identifying idle times between bursts.

5. The data processing system of claim 1, wherein estimating the data volumes comprises distinguishing between a buffering phase and a steady-state phase of the media stream, and assessing the data volumes during the steady-state phase.

6. The data processing system of claim 1, wherein estimating the data volumes comprises distinguishing between a buffering phase and a steady-state phase of the media stream, and assessing the data volumes during the buffering phase.

7. The data processing system of claim 1, wherein execution of the code by the one or more processors causes the data processing system to further perform operations comprising:
calculating a performance metric of the media stream from the estimated data volumes of the traffic bursts.

8. The data processing system of claim 7, wherein calculating the performance metric comprises calculating at least one of a start delay, an occurrence of one or more stalls and a length of the stalls in the media stream.

9. The data processing system of claim 1, wherein the traffic bursts convey respective content segments having a predefined playback duration, and wherein deriving the given media bit-rate comprises, when the media stream is subject to congestion in the network, estimating the given media bit-rate based on the playback duration.

10. The data processing system of claim 1, wherein execution of the code by the one or more processors causes the data processing system to further perform operations comprising:
   estimating the data volumes and deriving the given media bit-rate only in response to verifying that the media stream matches an Adaptive Bit-Rate (ABR) traffic pattern.

11. The data processing system of claim 1, wherein deriving the given media bit-rate comprises verifying that the data volumes of the two or more traffic bursts differ from one another by no more than a predefined difference.

12. The data processing system of claim 1, wherein deriving the given media bit-rate comprises selecting a media bit-rate that best matches the estimated data volumes from among a predefined set of media bit-rates.

13. The apparatus according to claim 1, wherein execution of the code by the one or more processors causes the data processing system to further perform operations comprising:
   identifying respective start times of the traffic bursts; and
   distinguishing between the traffic bursts using the identified start times.

* * * * *